United States Patent Office 3,060,023

Patented Oct. 23, 1962

3,060,023

IMAGE REPRODUCTION PROCESSES

Marion Burg, Metuchen, and Abraham Bernard Cohen, Springfield, N.J., assignors to E. I. du Pont de Nemours and Company, Wilmington, Del., a corporation of Delaware No Drawing. Filed Aug. 5, 1959, Ser. No. 831,700

22 Claims. (Cl. 96—28)

This invention relates to an image reproduction process and more particularly to a process for transferring images from photopolymerized image-bearing elements to a new receptor surface. Still more particularly, it relates to a dry thermal process for so transferring such images.

Various processes for producing copies of an image embodying thermal transfer are known. In one of the commercially promising processes, the thermal transfer is accomplished in a wet system or one where water-yielding materials are present in addition to light-sensitive materials. Other thermal transfer processes are known, but to the best of applicants' knowledge no practical dry processes for transferring images from photopolymerized image-bearing elements have been proposed.

An object of this invention is to provide new and practical thermal processes for transferring a plurality of images from elements bearing photopolymerized images. Another object is to provide such processes which are simple and dependable. A further object is to provide such processes which utilize simple and economical apparatus. A still further object is to provide such processes which involve exposure of a photopolymerizable thermoplastic composition to light to form a non-thermoplastic image in the exposed areas and melting the underexposed areas and transferring the melted areas to a second support. Still further objects will be apparent from the following description of the invention.

The above objects are accomplished in accordance with the present invention which in its broader aspects comprises a thermal transfer process for transferring a thermoplastic photographic image from a stratum on a sheet support, said stratum being solid below 40° C., and containing (1) image areas (underexposed) which are thermally transferable by having a stick or transfer temperature above 40° C. and below 220° C., comprising (*a*) a thermoplastic compound solid at 50° C., and (*b*) an ethylenically unsaturated compound containing at least one terminal ethylenic group, having a boiling point above 100° C. at normal atmospheric pressure, being capable of forming a high polymer by photoinitiated addition polymerization and having plasticizing action on said thermoplastic polymeric compound; said constituents (*a*) and (*b*) being present in amounts from 3 to 97 and 97 to 3 parts by weight, respectively, and (2) complementary adjoining coplanar image areas (i.e., exposed reverse image areas) solid at 50° C. and comprising an addition polymer of an aforesaid monomer and said thermoplastic polymeric compound. Said stratum preferably also contains (*c*) an addition polymerization initiator activatable by actinic light and thermally inactive below 185° C. in an amount from 0.001% to 10% by weight of the components, and (*d*) an addition polymerization inhibitor in an amount from 0.001% to 2.0% by weight of the components. The thermal transfer process comprises pressing the surface of said stratum into contact with the image-receptive surface of a separate element, heating at least one of said elements to a temperature of at least 40° C., and separating the two elements whereby the thermally transferable underexposed image areas of said stratum transfer to said image-receptive element.

The term "underexposed" as used herein is intended to cover the image areas which are completely unexposed or partially exposed so that there is a material amount of the addition polymerizable compound still present and insufficient addition polymer image has been formed to bind the constituents so that the image areas do not melt and become transferred to the image-receptive element. The term "transfer temperature" means the temperature at which the image areas in question stick or adhere, within 10 seconds, under slight pressure, e.g., thumb pressure, to analytical filter paper (Schleicher & Schuell analytical filter paper #595).

In general, in the process, components (*a*) and (*b*) are present in amounts from 10% to 95% and 5% to 90% by weight, respectively, based on the weight of polymer and monomer. Also, the compositions are such that they do not melt at temperatures below 40° C. and are not thermally polymerizable within 0.5 second at temperatures below the melting point of the composition.

The foregoing thermoplastic image-bearing elements can be made by exposing to actinic light, imagewise, a layer having the constitution defined above for the thermally transferable image areas of item (1) above until substantial addition polymerization takes place in the exposed areas to form an addition polymer and no significant polymerization takes place in the underexposed areas. The exposure can be through a stencil, line or halftone negative or positive, a cutout stencil in contact with the layer or by reflectographic or projection exposure.

While the addition polymerizable component present in the underexposed areas of the photopolymerizable element can be a monomeric ethylenically unsaturated compound capable of polymerizing or forming a high polymer in a short time, e.g., 0.5–10 seconds, by photoinitiated polymerization as disclosed in Plambeck U. S. 2,760,863, the particularly useful compounds fall within a general class, namely, normally non-gaseous (i.e., at 20° C. and atmospheric pressure) ethylenically unsaturated monomeric compounds having one to four terminal ethylenic groups, preferably two, a molecular weight of not more than 1500, a normal boiling point above 100° C., and a plasticizing action on the thermoplastic polymer.

In practicing the invention, a photopolymerizable element containing an image-yielding stratum of the above components is exposed to actinic radiation through a photographic process transparency, e.g., a photographic positive, negative, two-tone or halftone, a light-transmitting paper, or to an image or printed matter on an opaque support by means of reflux exposure, and is intimately brought into contact under pressure with a receptor support, e.g., paper, metal, synthetic polymer, screen, etc., during which time the element is heated in the range of 40° to 220° C. or more, and while still warm the surfaces are separated. The thermoplastic photopolymerizable composition is transferred to the paper, metal, etc. support in the areas corresponding to the unexposed, or least exposed, areas to give at least one duplicate copy of the original positive, negative or original image. Multiple copies can be obtained by repeating the heat transfer procedure using appropriate coating thicknesses of the photosensitive layer, pressures and temperatures to give the desired number of copies. The process can be used to prepare a silk screen. In the silk screen embodiment the thickness of the layer will depend on the nature of the screen, e.g., a coarser screen requires a heavier coating.

The process is quite versatile and photo-polymerizable elements disclosed in Plambeck U.S. Patent 2,760,863 can be used to prepare the element with the photopolymerized image. Relief images ranging in depth from a fraction of a mil up to 10 mils or more can be formed by the instance process, but unlike the processes described in the Plambeck patent, a relief image is formed by thermal transfer of the unexposed areas of the photopolymerizable stratum and not by the solvent washout of said unexposed areas.

Suitable thermoplastic polymers for use as components (*a*) include:

(A) Copolyesters, e.g., those prepared from the reaction product of a polymethylene glycol of the formula $HO(CH_2)_nOH$, wherein *n* is a whole number 2 to 10 inclusive, and (1) hexahydroterephthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids.

(B) Nyons or polyamides, e.g., N-methoxymethyl polyhexamethylene adipamide;

(C) Vinylidene chloride copolymers, e.g., vinylidene chloride/acrylonitrile; vinylidene chloride/methylacrylate and vinylidene chloride/vinylacetate copolymers;

(D) Ethylene/vinyl acetate copolymer;

(E) Cellulosic ethers, e.g., methyl cellulose, ethyl cellulose and benzyl cellulose;

(F) Polyethylene;

(G) Synthetic rubbers, e.g., butadiene/acrylonitrile copolymers, and chloro-2-butadiene-1,3 polymers;

(H) Cellulose esters, e.g., cellulose acetate, cellulose acetate succinate and cellulose acetate butyrate;

(I) Polyvinyl esters, e.g., polyvinyl acetate/acrylate, polyvinyl acetate/methacrylate and polyvinyl acetate;

(J) Polyacrylate and alpha-alkyl polyacrylate esters, e.g., polymethyl methacrylate and polyethyl methacrylate;

(K) High molecular weight polyethylene oxides of polyglycols having average molecular weights from about 4,000 to 1,000,000;

(L) Polyvinyl chloride and copolymers, e.g., polyvinyl chloride/acetate;

(M) Polyvinyl acetal, e.g. polyvinyl butyral, polyvinyl formal;

(N) Polyformaldehydes;

(O) Polyurethanes;

(P) Polycarbonates;

(Q) Polystyrenes.

To the thermoplastic polymer constituent of the photopolymerizable composition there can be added nonthermoplastic polymeric compounds to give certain desirable characteristics, e.g., to improve adhesion to the base support, adhesion to the receptor support on transfer, wear properties, chemical inertness, etc. Suitable nonthermoplastic polymeric compounds include polyvinyl alcohol, cellulose, anhydrous gelatin, phenolic resins and melamine-formaldehyde resins, etc. If desired, the photopolymerizable layers can also contain immiscible polymeric or non-polymeric organic or inorganic fillers or reinforcing agents which are essentially transparent at the wave-lengths used for the exposure of the photopolymeric material, e.g., the organophilic silicas, bentonites, silica, powdered glass, colloidal carbon, as well as various types of dyes and pigments, in amounts varying with the desired properties of the photopolymerizable layer. The fillers are useful in improving the strength of the composition, reducing tack and in addition, as coloring agents.

Suitable addition polymerizable ethylenically unsaturated compounds for use as components (*b*) which can be used with the above-described thermoplastic polymer compounds include unsaturated esters of polyols, particularly such esters of the alpha-methylene carboxylic acids, e.g., ethylene diacrylate, diethylene glycol diacrylate, glycerol diacrylate, glycerol triacrylate, ethylene dimethacrylate, 1,3-propanediol dimethacrylate 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, the bis-acrylates and methacrylates of polyethylene glycols of molecular weight 200–500, and the like; unsaturated amides, particularly those of the alpha-methylene carboxylic acids, and especially those of alpha-omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-(beta-hydroxyethyl)-beta-(methacrylamido)ethyl acrylate and N,N-bis(beta-methacrylyloxyethyl)acrylamide; vinyl esters such as divinyl succinate, divinyl adipate, divinyl phthalate, divinyl terephthalate, divinyl benzene-1,3-disulfonate, and divinyl butane-1,4-disoulfonate; and unsaturated aldehydes, such as sorbaldehyde (hexadienal). An outstanding class of these preferred addition polymerizable components are the esters and amides of alpha-methylene carboxylic acids and substituted carboxylic acids with polyols and polyamines wherein the molecular chain between the hydroxyls and amino groups is solely carbon or oxygen-interrupted carbon. The preferred monomeric compounds are difunctional, but monofunctional monomers can also be used. The amount of monomer added varies with the particular thermoplastic polymer used.

A preferred class of addition polymerization initiators (*c*) activatable by actinic light and thermally inactive at and below 185° C. includes the substituted or unsubstituted polynuclear quinones which are compounds having two intracyclic carbonyl groups attached to intracyclic carbon atoms in a conjugated six-membered carbocyclic ring, there being at least one aromatic carbocyclic ring fused to the ring containing the carbonyl groups. Suitable such initiators include 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8,9,10-tetrahydronaphthacenequinone, and 1,2,3,4-tetrahydrobenzenz[a]anthracene-7,12-dione. Other photoinitiators which are also useful are described in Plambeck U.S. Patent 2,760,863 and include vicinal ketaldonyl compounds, such as diacetyl, benzil, etc.; α-ketaldonyl alcohols, such as benzoin, pivalon, etc.; acyloin ethers, e.g., benzoin methyl and ethyl ethers, etc.; α-hydrocarbon substituted aromatic acyloins, including α-methylbenzoin, α-allylbenzoin, and α-phenylbenzoin.

Suitable thermal polymerization inhibitors (*d*) that can be used in addition to the preferred p-methoxyphenol include hydroquinone, and alkyl and aryl-substituted hydroquinones and quinones, tert-butylcatechol, pyrogallol, copper resinate, naphthylamines, beta-naphthol, cuprous chloride, 2,6-di-tert-butyl p-cresol, phenothiazine, pyridine, nitrobenzene and dinitrobenzene. Other useful inhibitors include p-toluquinone and chloranil.

Various dyes, pigments, thermographic compounds and color forming components can be added to the photopolymerizable compositions to give varied results after the thermal transfer. These additive materials, however, preferably should not absorb excessive amounts of light at the exposure wave length or inhibit the polymerization reaction.

Among the dyes useful in the invention are Fuchsine (C.I. 42510), Auramine Base (C.I. 41000B), Calcocid Green S (C.I. 44090), Para Magenta (C.I. 42500), Tryparosan (C.I. 42505), New Magenta (C.I. 42520), Acid Violet RRL (C.I. 42425), Red Violet 5RS (C.I. 42690), Nile Blue 2B (C.I. 51185), New Methylene Blue GG (C.I. 51195), C.I. Basic Blue 20 (C.I. 42585), Iodine Green (C.I. 42556), Night Green B (C.I. 42115), C.I.

Direct Yellow 9 (C.I. 19540), C.I. Acid Yellow 17 (C.I. 18965), C.I. Acid Yellow 29 (C.I. 18900), Tartrazine (C.I. 19140), Supramine Yellow G (C.I. 19300), Buffalo Black 10B (C.I. 27790), Naphthalene Black 12R (C.I. 20350), Fast Black L (C.I. 51215), and Ethyl Violet (C.I. 42600).

Suitable pigments include, e.g., $TiO_2$, colloidal carbon, graphite, phosphor particles, ceramics, clays, metal powders such as aluminum, copper, magnetic iron and bronze, etc. The pigments are useful when placed in the photosensitive layer or in an adjacent nonphotosensitive layer.

Useful thermographic additives, e.g., 3 cyano-4,5-dimethyl-5-hydroxy-3-pyrrolin-2-one, and activators, e.g., copper acetate, are disclosed in the application of Holland and Wayrynen, Ser. No. 807,761, filed April 21, 1959, and the following U.S. Patents: 2,625,494, 2,637,657, 2,663,654, 2,663,655, 2,663,656, and 2,663,657.

Suitable color-forming components which form colored compounds on the application of heat or when brought in contact with other color forming components on a separate support, e.g., (1) Organic and inorganic components: dimethyl glyoxime and nickel salts; phenolphthalein and sodium hydroxide; starch/potassium iodide and oxidizing agent, i.e., peroxides; phenols and iron salts; thioacetamide and lead acetate; silver salt and reducing agent, e.g., hydroquinone.

(2) Inorganic components: ferric salts and potassium thiocyanate; ferrous salts and potassium ferricyanide; copper or silver salts and sulfide ions; lead acetate and sodium sulfide.

(3) Organic components: 2,4-dinitrophenylhydrazine and aldehydes or ketones; diazonium salt and phenol or naphthol, e.g., benzenediazonium chloride and β-naphthol; p-dimethylaminobenzaldehyde and p-diethylaminoaniline.

The photopolymerizable composition is preferably coated on a base support. Suitable support materials are stable at the heating temperatures used in the instant invention. Suitable bases or supports include those disclosed in U.S. Patent 2,760,863, glass, wood, paper, cloth, cellulose esters, e.g., cellulose acetate, cellulose propionate, cellulose butyrate, etc., and other plastic compositions, etc. The support may have in or on its surface and beneath the photopolymerizable stratum an antihalation layer as disclosed in said patent or other substrata needed to facilitate anchorage to the base.

The receptor support to which the image is transferred must also be stable at the process temperatures. The particular support used is dependent on the desired use for the transferred image and on the adhesion of the image to the base. Suitable supports include paper including bond paper, resin and clay sized paper, resin coated or impregnated paper, cardboard, metal sheets, foils and meshes e.g., aluminum, copper, steel, bronze, etc.; wood, glass, nylon, rubber, polyethylene, linear condensation polymers such as the polyesters, e.g., polyethylene terephthalate, regenerated cellulose, cellulose esters e.g., cellulose acetate, silk, cotton, and viscose rayon fabrics or screens.

As previously mentioned, the receptive support may have a hydrophilic surface or may contain on its surface chemical compounds which react with compounds being transferred so as to produce differences in color, hydrophilicity or conductivity between the exposed and underexposed or unexposed areas or for improved adhesion or brightening of the receptive support. The receptor surface may be smooth, contain roughening agents such as silica, be perforated or be in the form of a mesh or screen.

Prior to the transfer of a portion of the photopolymerizable layer (in underexposed areas), the layer is exposed to actinic radiation. This may be through a two-tone image or a process transparency, e.g., a process negative or positive (an image-bearing transparency consisting solely of substantially opaque and substantially transparent areas where the opaque areas are substantially of the same optical density, the so-called line or halftone negative or positive). The image or transparency may or may not be in operative contact, e.g., contact exposure or projection exposure. It is possible to expose through paper or other light transmitting materials. A stronger light source or longer exposure times must be used, however.

Reflex exposure techniques are especially useful in the present invention, particularly when office copies are made. By using reflex exposure, copies can be made from opaque supports, e.g., paper, cardboard, metal, etc., as well as from poor light transmitting surfaces with no loss in speed, excellent resolution, and in addition, right reading copies are obtained directly on transfer.

Since free-radical-generating addition-polymerization initiators activatable by actinic light generally exhibit their maximum sensitivity in the ultraviolet range, the light source should furnish an effective amount of this radiation. Such sources include carbon arcs, mercury-vapor arcs, fluorescent lamps with ultraviolet light-emitting phosphors, argon glow lamps, electronic flash units and photographic flood lamps. Of these, the mercury-vapor arcs, particularly the sunlamp type, and the fluorescent sunlamps, are most suitable. The sunlamp mercury-vapor arcs are customarily used at a distance on one and one-half to ten inches from the photopolymerizable layer.

After the exposure of the photopolymerizable layer, the exposed composition is contacted with the receptor support while simultaneously heat is applied to effect the transfer of the underexposed areas of the photopolymerizable composition. While the heat is preferably applied simultaneously with the contact of the exposed element to the receptord support, the heat can be applied at any stage of the process prior to the separation step to either or both elements provided the transfer temperatures correspond to at least the softening temperature of the photopolymerizable stratum. Heat can be applied by means well known to the art, e.g., rollers, flat or curved heating surfaces or platens, radiant sources, e.g., heating lamps, etc.

The heating temperature can range from above 40° C. to about 220° C. and the contact time for 0.1 to 10 seconds. In general about 0.1 second is adequate and shorter periods of contact are possible by using an intense radiant source of heat, e.g., infrared lamps or heat sources. Preferably the temperature range is 55° C. to 120° C.

The invention will be further illustrated by, but is not intended to be limited to the following detailed examples.

*Example I*

A thermoplastic photopolymerizable composition was prepared by ball-milling for 2 hours 30 g. of a solution of polyethylene terephthalate/sebacate (50 mole percent) in methylene chloride (18% by weight solids), 5.4 g. of triethylene glycol diacrylate, 0.005 g. of a photoinitiator, anthraquinone, and 0.005 g. of a thermal inhibitor, p-methoxyphenol. To the photopolymerizable composition was added 0.2 g. of a red dye, 1,1′-diethyl-2,2′-cyanine iodide. The photopolymerizable solution containing the dye was coated to a depth of 10 mils on a 4-mil thick polyethylene terephthalate film support bearing a subcoat of a copolymer of vinylidene chloride/methyl acrylate/itaconic acid as disclosed in Alles et al., U.S. Patent 2,627,088. The coating was dried and a 2-mil thick photopolymerizable layer resulted. The dry surface of said layer was brought into contact with a photographic positive transparency containing line and letter text images and the film was exposed through the positive for 1 minute to a 275-watt, 60-cycle low-pressure, mercury-arc light source ("Hanovia" lamp) at a distance of 4 inches whereby photopolymerization took place in the areas of the layer which were exposed to light. The exposed layer was then brought into intimate contact with a sheet of white paper and the resulting sandwich was heated by means of a hot flat heating element pressing against the reverse surface of the film support at a temperature of 100° C. for 3 seconds. While still warm the two surfaces were stripped apart. The unexposed, dyed, thermoplastic, photopolymerizable material transferred from its original support to the paper forming a well defined, high contrast copy of the original image on the paper and leaving a reverse negative letter text, in relief, on the original support. At room temperature, the new image was non-tacky and firm. Multiple copies were obtained by repeating the thermal transfer process described above using new paper sheets.

*Example II*

A thermoplastic photopolymerizable composition prepared by mixing 8 g. of low viscosity polyvinyl acetate acrylate (containing a maximum of 10 mole percent acrylyl groups) in 10 ml. of methylene chloride, 1.6 g. triethylene glycol diacrylate, 0.002 g. of anthraquinone and 0.002 g. of p-methoxyphenol, and Fuchsine dye (C.I. 42510) dissolved in ethanol to impart a magenta color to film (optical density of the coated support equals 0.9 at 565 m$\mu$), was coated on a 1-mil polyethylene terephthalate film. The dry surface of the photopolymerizable layer, 0.5-mil thick, was brought into contact with a photographic positive transparency containing line and letter text images and then placed in a vacuum frame. The vacuum frame containing the photopolymerizable element was placed beneath a 1800-watt high-pressure mercury arc and was exposed for 4 seconds to 1.75 watts of actinic radiation per square inch. After removing the exposed element from the vacuum frame, it was brought into intimate contact for 0.5 second with a sheet of white paper which had been preheated to 85° C., and while warm the two supports were separated. The unexposed, dyed thermoplastic photopolymerizable material was transferred to the surface of the paper to provide a direct copy of the original letter text positive. The quality was comparable to that described in Example I. At room temperature, the transferred image was non-tacky. By repeating the thermal transfer process, five times, satisfactory direct copies of the original image were obtained on five paper sheets.

*Example III*

A dyed, thermoplastic photopolymerizable composition as described in Example II, was coated on a polyethylene terephthalate film base support and exposed imagewise to actinic light by the procedures described in Example II. The exposed surface was brought into intimate contact with the surface of a clean aluminum sheet and the sandwich was passed between 2 rollers, one of which was heated to 85° C. The supports were immediately separated as they emerged from the rollers. The transferred image was post-exposed over its entire area to the actinic light source in a similar manner and a durable lithographic printing plate obtained. The transferred material was ink-receptive and hydrophobic, adherence to the aluminum support was excellent and after 500 copies of the image were reproduced using an offset copying machine (a "Multilith Duplicator," Model 1250, manufactured by the Addressograph-Multigraph Corporation, Cleveland, Ohio), no sign of wear or degradation was apparent.

*Example IV*

A dyed, thermoplastic photopolymerizable composition as described in Example II, was coated on a polyethylene terephthalate film base support and exposed imagewise to actinic light by the prodecures described in Example II. The exposed surface was brought into intimate contact with a fine mesh screen of silk mounted on a wooden frame and supported by a firm aluminum sheet. The reverse side of the photopolymerizable composition support was heated to a temperature of 110° C. for 3 seconds and the warm supports separated, leaving the unexposed areas attached to the silk screen. The silk screen, after post-exposing for 3 seconds to the light source described in Example II, was used for printing and well defined, high contrast copies of the original image were obtained.

*Example V*

A thermoplastic, photopolymerizable composition was prepared from 19 g. of an aqueous solution of low viscosity polyethylene oxide, molecular weight of at least 100,000 (10% solids by weight), 1.9 g. of polyethylene glycol diacrylate (made from a mixture of polyethylene glycols having an average molecular weight of about 300), 0.002 g. of anthraquinone, 0.002 g. of p-methoxyphenol and 0.5 g. of lead acetate dissolved in 2 ml. of water. The composition solution was cast to a thickness of 10 mils on the polyethylene terephthalate film described in Example II. After air drying in the absence of light, a 1-mil thick, dry photopolymerizable layer was obtained on the support. The layer was exposed through a photographic positive transparency containing line and letter text images of 1.75 watts of actinic radiation per square inch for 10 seconds as described in Example II. The exposed surface was brought into intimate contact with the dry surface of a sheet of white paper which had been saturated with an ethanol solution of thio-acetamide (20% solids). The resulting sandwich was heated to 60° C. for 10 seconds through the reverse side of the film support as described in Example I. The unexposed material transferred to the paper and a brown-black image corresponding to the original image was formed. Several copies were made by repeating the contact and heating procedures.

*Example VI*

A thermoplastic photopolymerizable composition was prepared from 8 g. of medium viscosity polyvinyl acetate (a benzene solution containing 86 g./100 cc. of solution having a viscosity of 90–110 centipoises at 20° C.), 25 ml. methylene chloride, 4 g. triethylene glycol diacrylate, 0.004 g. anthraquinone and 0.004 g. p-methoxyphenol. Fifty milligrams of p-dimethylaminobenzaldehyde dissolved in 2 ml. of methylene chloride was added to the photopolymerizable solution and the solution was cast to a wet thickness of 5 mils on the polyethylene terephthalate support described in Example II. After drying, the clear photopolymerizable layer was about 0.5 mil thick. The film was exposed through an image bearing positive transparency to 1.75 watts of actinic radiation per square inch for 10 seconds as described in Example II. The exposed surface was then brought into intimate contact with a dry sheet of white paper which had been saturated with an ethanol solution of p-diethylaminoaniline hydrochloride (20% solids). The resulting sandwich was heated as described in Example I at 130° C. for about 5 seconds and the two surfaces were separated while warm. The unexposed thermoplastic material was transferred to the paper support and an orange-pink colored image formed in the transferred area.

*Example VII*

A thermoplastic photopolymerizable composition was prepared from 12 g. of low viscosity polyvinyl acetate methacrylate (containing a maximum of 20 mole percent of methacrylyl groups), 12 ml. of ethanol, 2.54 g. of polyethylene glycol diacrylate of the type described in Example V, 0.009 g. of anthraquinone and 0.009 g. of p-methoxyphenol. To a one-third portion of the photopolymerizable composition there was added 0.06 g. of a blue-green dye, Calcocid Green S (C.I. 44090), in 4 ml. of ethanol. Two similar compositions were prepared adding to one 0.06 g. of a magenta dye, Fuchsine (C.I. 42510), in 4 ml. of ethanol and to the other 0.06 g. of a yellow dye, Auramine Base (C.I. 41000B), in 4 ml. of ethanol. The resulting dye-containing photopolymerizable solutions were cast to a wet thickness of 1 mil on polyethylene terephthalate film supports described in Example II and the layers were allowed to dry in the dark. Firm, dry layers, 0.5-mil thick, were obtained. Each layer was exposed through a halftone, three color separation-positive type photographic image to 1.75 watts of actinic radiation per square inch for 10 seconds as described in Example II. The exposed magneta colored photopolymerizable layer was brought into intimate contact with a sheet of white paper and subsequently passed through rollers, one of which was heated to 85° C. The time of contact was about one-half second. The unexposed area was transferred to the paper. In like manner the blue-green and then the yellow unexposed areas of their respective photopolymerizable layers were transferred in register to the same paper sheet. A well defined, high contrast, three color reproduction of the original image was formed on the paper sheet.

*Example VIII*

A photopolymerizable composition similar to that described in Example II was prepared, except that the dye was omitted. The composition was coated to a dry thickness of 0.5 mil on a 1-mil thick dry layer of an aqueous colloidal carbon dispersion (25 percent by weight of solids and having a carbon particle size of 73 mμ) supported on a 1-mil thick polyethylene terephthalate film support. The photopolymerizable layer was exposed to 1.75 watts of actinic radiation per square inch for 1 second, through an image bearing photographic positive. The exposed photopolymerizable composition was brought into intimate contact with a sheet of white paper, and the resulting sandwich was heated for 4 seconds by contacting the film support with a flat iron, which had been preheated to 110° C. The two warm surfaces were separated. The unexposed areas of the photopolymerizable composition transferred to the paper forming a black image, a copy of the original image.

*Example IX*

Example II was repeated except that 1 g. of magnetic iron (25 mμ particle size) was added to the photopolymerizable composition in place of the dye. The thermoplastic, photopolymerizable layer was exposed, brought into intimate contact with a heated sheet of paper as described in Example II and while warm the two supports were stripped apart. The unexposed thermoplastic material containing the magnetic iron was transferred from its original support to the paper to give a copy of the original image.

*Example X*

A photopolymerizable composition was prepared as described in Example I and was coated on a 4-mil thick polyethylene terephthalate photographic film support to a dry thickness of 2 mils as described in Example I. On the light sensitive surface was placed first, a 1-mil thick polyethylene terephthalate layer, and second, a glossy, opaque, white paper with a black printed image, the image side being toward the photopolymerizable surface (the 1-mil thick polyethylene terephthalate film prevented dye in the photopolymerizable layer from staining the paper). The element was placed in a vacuum frame and exposed reflectographically for 54 seconds at a distance of 6 inches to actinic light from a 275-watt sunlamp through the backside of the polyethylene terephthalate photographic film support. The exposed photopolymerizable layer was brought into intimate contact with a sheet of white paper. The resulting sandwich was then heated through the reverse side of the film support by contact for 5 seconds with a flat iron which had been preheated to 140° C. and while still warm the supports were separated. The photopolymerizable material was transferred from the areas in contact with the printed image forming a right reading copy of the original image in red print on the surface of the paper.

*Example XI*

A photopolymerizable composition was prepared as described in Example I and was coated on a 4-mil thick polyethylene terephthalate photographic film support to a dry thickness of 4 mils. The photopolymerizable layer was brought into intimate contact with an image-bearing photographic negative, the emulsion side being in contact with the photopolymerizable layer. The system was placed in a vacuum frame and exposed to 1.75 watts of actinic radiation per square inch for 2 seconds as described in Example II. The exposed film was removed from the vacuum frame, the layer was brought into intimate contact with a sheet of paper and the resulting sandwich was heated for 5 seconds through the film support by means of a flat surface preheated to 140° C. The unexposed areas of the photopolymerizable layer transferred to the paper support. The exposed areas of the photopolymerizable composition which did not transfer formed a positive relief image. The unexposed relief image, 4-mils thick, was post-exposed to actinic light for 2 seconds as described above. When the printing relief was used for printing in a rotary press, good copies were obtained.

*Example XII*

A photopolymerizable composition was prepared by mixing 4 g. of low viscosity polyvinyl acetate methacrylate (containing a maximum of 20 mole percent of methacrylyl groups), 4 ml. of ethanol, 0.85 g. of a polyethylene glycol diacrylate (as described in Example V), 0.003 g. of anthraquinone and 0.003 g. of p-methoxyphenol. To the photopolymerizable composition there was added 0.06 g. of a blue-green dye, Calcocid Green S (C.I. 44090) in 4 ml. of ethanol and the resulting solution was cast to a wet thickness of 1 mil on a polyethylene terephthalate photographic film support. The solution was allowed to dry in the dark and a firm, dry layer, 0.5-mil thick was obtained. The layer was exposed to 1.75 watts of actinic radiation per square inch for 10 seconds through an image-bearing photographic positive in contact with the light sensitive composition as described in Example II. The exposed photopolymerizable layer was brought into intimate contact with a sheet of paper while simultaneously heating the assemblage to 100° C. during the contact period of 0.5 second. The two warm contacting surfaces were separated and the unexposed areas of the photopolymerizable layer were transferred to the paper. The cooled, transferred surface was wet with an ethanol-water solution (40% by volume) and was brought into intimate contact with a sheet of white paper at room temperature. When the surfaces of the two sheets were separated, a blue-green image was obtained on the new paper sheet as the result of dye transfer. Multicopies were prepared by repeating the latter described wet transfer procedure.

*Example XIII*

To 12 grams of a photopolymerizable composition described in Example VII there was added 104 mg. of 3-cyano-4,5-dimethyl-5-hydroxy-3-pyrrolin - 2 - one and 34 mg. copper acetate dissolved in 5 ml. ethanol. The photopolymerizable composition containing the thermographic material was coated on a 4-mil thick polyethylene terephthalate photographic film support to a dry thickness of 0.5 mil. The dry layer was brought into contact with an image-bearing photographic positive in a vacuum frame and the layer was exposed as described in Example VII. After removing the exposed layer from the vacuum frame it was brought into intimate contact with a sheet of paper and the resulting sandwich was heated to 170° C. for 3 seconds through the film support by means of a hot, flat metal surface. The warm contacting surfaces were separated and a black image corresponding to the photographic positive was obtained on the surface of the paper. Up to 4 copies were obtained when the transfer procedure was repeated.

*Example XIV*

A photopolymerizable composition containing a Fuchsine dye (C.I. 42510) was prepared, was coated on a polyethylene terephthalate film base support, and was exposed to actinic light as described in Example II. The unexposed areas of the photopolymerizable composition were transferred to a clean aluminum sheet by the procedure described in Example III and the transferred surface was post-exposed to 1.75 watts of actinic radiation per square inch for 4 seconds using the light source described in Example II. The printing element formed was etched for 15 minutes by a 3% by weight solution of HCl. A photoengraving printing plate resulted which was suitable for printing.

*Example XV*

A dye-containing, photopolymerizable solution was prepared by mixing 6 g. of an acetone-cellulose acetate butyrate solution (20% by weight of solids) (the cellulose acetate butyrate contains 20% acetyl groups, 26% butyryl groups and has a viscosity of 56 to 131 poises determined by A.S.T.M. method D–1343–54T in the solution described as Formula A, A.S.T.M. method D–871–54T), 0.8 g. of polyethylene glycol diacrylate (average molecular weight of the diol precursor being 300), 1.5 ml. of ethanol, and 10 mg. of Calcocid Green S dissolved in 2 ml. of ethanol and 5 ml. of acetone. The photopolymerizable solution was coated on a 1.5-mil thick polyethylene terephthalate film base to a dry layer thickness of 0.5 ml. The coated film was half-covered by a piece of black cardboard and was placed in a vacuum frame. The layer was exposed to 1.75 watts of actinic radiation per square inch for 22 seconds from a 1,800 watt, high pressure mercury-arc lamp. After removal from the vacuum frame, only the exposed surface of the photopolymerizable element was brought into intimate contact with a sheet of white paper and the resulting sandwich was heated at 147° C. for 7 seconds. (No thermal transfer occurred at temperatures below 147° C.) Upon separating the two surfaces, the exposed area of the photopolymerizable layer transferred to the paper. In like manner, the unexposed area of the photopolymerizable layer was brought into intimate contact with a paper support and the element formed was heated at 121° C. for 7 seconds. The unexposed area transferred to the paper support when the two surfaces were separated. This example illustrates that polymerization can occur in the absence of a photoinitiator and that the exposed area will not thermally transfer at the transfer temperature of the unexposed area, e.g., 121° C.

*Example XVI*

A photopolymerizable solution was prepared by mixing 10 g. of an acetone solution containing 2.5 g. of cellulose acetate butyrate (the cellulose acetate butyrate contains 20.5% acetyl groups, 26% butyryl groups and has a viscosity of 9.0–13.5 poises determined by A.S.T.M. method D–1343–54T in the solution described as Formula A, A.S.T.M. method D–871–54T), 0.039 g. phenanthraquinone, 0.023 mg. Calcocid Green S dye with a solution consisting of 8 cc. of acetone and 2.5 g. of polyethylene glycol diacrylate (average molecular weight of the diol precursor being 300). The solution was coated on 1-mil thick polyethylene terephthalate film base to a dry layer thickness of 1.4 mils. The coated film was brought into contact with a photographic positive type combined halftone and letter text image transparency and the system was placed in a printing frame. The film surface was exposed through the glass of the printing frame and the photographic transparency for one minute at a distance of three inches to a 275-watt sunlamp having a 105-watt mercury arc output. The exposed photopolymerizable surface was brought into intimate contact with the surface of a paper sheet and the sandwich was heated between 2 rollers, one of which was heated to 155° C. The supports were immediately separated as they emerged from the rollers. A well defined, high contrast copy of the original image was formed on the paper support. Similar image reproductions were obtained by using either Pyrex glass or polyethylene terephthalate film base as the receptor support.

*Example XVII*

A photopolymerizable solution was prepared by adding 10 g. of a methyl ethyl ketone solution containing 2.58 g. of "Vinylite" resin (consisting of approximately 90 percent by weight of vinyl chloride and 10 percent by weight vinyl acetate and having a specific viscosity of 0.88–0.93 for 1 g. of resin per 100 cc. of solution in methyl isobutyl ketone at 20° C. and manufactured by Union Carbide Corp., New York), 0.031 g. of phenanthrenequinone and 0.009 g. of extra concentrated Calcocid Green S (C.I. 44090), 0.86 g. of polyethylene glycol diacrylate (average molecular weight of diol percursor is 300) containing 0.017 g. of phenanthrenequinone and 9 cc. of a 0.2 percent solution of anthraquinone in acetone. The solution was coated on 1-mil thick polyethylene terephthalate film base to a wet thickness of 13 mils and was allowed to dry. The dry surface was brought into contact with a photographic positive type combined halftone and lettertext image transparency and the system was placed in a printing frame. The film surface was exposed through the glass of the printing frame and the photographic transparency for one minute at a distance of four inches to a 275-watt sunlamp having a 105-watt mercury arc output. The exposed surface was then brought into intimate contact with a paper receptor as described in Example XVI except that one of the rollers was heated to about 160° C. A copy of the original transparency was obtained on the new paper support when the surfaces were separated.

*Example XVIII*

A photopolymerizable solution was prepared containing 1 g. of cellulose acetate butyrate (containing 37% butyryl groups, 13% acetyl groups, 2% hydroxyl groups and having a viscosity of 64 to 124 poises determined by the method described in Example XVI), 1.0 g. polyethylene glycol diacrylate as described in Example XVI, 0.01 g. Calcocid Green S dye extra concentrated, 0.008 g. of phenanthrenequinone and acetone to bring the weight to 20 g. The solution was coated on a 1.5 mil thick polyethylene terephthalate film base to a dry layer thickness of 0.4 mil. The dried thermoplastic photopolymerizable coating on the film base was brought into contact with the black printed image surface of a glossy, opaque white paper; the system was placed in a vacuum frame and was exposed for 2 seconds to a 275-watt General Electric type RS sunlamp at a distance of 10 inches from the vacuum frame. The exposed surface of the photopolymerizable coated film was brought into contact with a paper receptor as described in Example XVI except that one of the rollers was heated to 130° C. The pressure of the rolls exerted a force of 2.5 pounds per inch. A copy of the original image was obtained on the new paper support when the surfaces were separated.

The processes of the present invention are useful for a variety of copying, printing, decorative and manufacturing applications. Pigments, e.g., $TiO_2$, colloidal carbon, metal powders, phosphors, etc., and dyes which do not appreciably absorb light at the wave length being used for exposure or inhibit polymerization can be incorporated in the light-sensitive photopolymerizable layer, and by use of the instant process, images can be transferred to a receptor support. Multicopies of the process images can be obtained from the transferred image. The number of copies prepared is dependent on the photopolymerizable composition thickness as well as the process conditions. The process is also useful for preparing multicolor reproductions. Colorless constituents which form colored compounds when heat is applied or brought into contact with other color forming components are useful in the instant transfer process. Reflex exposures can be used for any of these applications provided the base support is transparent, and is especially useful in copying from poor or non-light transmitting supports, e.g., paper, cardboard, etc.

Lithographic surfaces can be produced by thermally transferring a hydrophobic layer to a hydrophilic receptor surface or vice versa. The images on the lithographic surface can be made impervious to chemical or solvent attack by post-exposing the lithographic surface. Alternatively, the exposed areas of the photopolymerizable composition, after the underexposed areas are transferred, can be used as a lithographic-offset printing plate if they are hydrophobic and the original sheet support is hydrophilic or vice versa. Silk screens can also be made by this process.

The transferred images are not only useful for making copies of the original image transparency by dry methods as indicated above but after transfer of the unexposed areas to a receptor support the thermoplastic surface can be treated with e.g., aqueous solutions, dyes, inks, etc. to form colored images. Colored copies of the original image can be obtained when the wet surface is brought into intimate contact with a receptor support and the surfaces separated (see Example XII). Solvents which are used for the spirit copying, e.g., ethanol, water, should meter out the dye used and be a non-solvent for the polymer, i.e. the solubility of the dye and binder are important factors in selecting the solvent. It is also possible to wet the photopolymerized surface, dry and then thermally transfer to obtain the colored copies. The process is also useful because it permits the rapid examination of the printing qualities, e.g., of separations negatives and positives, under conditions simulating true printing.

The instant process has the advantage that by a simple procedure, involving the use of light and heat in a dry system, copies of images which are of high quality and stability are obtained rapidly. The process is very versatile, i.e., it is useful in copying, e.g., multicopying, printing, silk screen processes and in color reproduction, including multicolor reproduction. Both line and halftone images can be transferred simultaneously. Still further advantages will be apparent to those skilled in the art of image formation.

What is claimed is:

1. A dry thermal process for transferring underexposed photographic images from a stratum on a support to a separate support, said stratum being solid below 40° C. and containing:

(1) underexposed image areas which are thermally transferable by having a stick or transfer temperature above 40° C. and below 220° C., comprising (*a*) a thermoplastic compound solid at 50° C. and (*b*) an ethylenically unsaturated compound containing at least one terminal ethylenic group, having a boiling point above 100° C. at normal atmospheric pressure, being capable of forming a high polymer by photoinitiated addition polymerization and having a plasticizing action on said thermoplastic compound, said constituents (*a*) and (*b*) being present in amounts from 3 to 97 and 97 to 3 parts by weight, respectively, and (2) exposed complementary adjoining image areas solid at 50° C., non-thermally transferable at said stick or transfer temperature at which the underexposed areas are thermally transferable, and comprising an addition polymer of an aforesaid ethylenically unsaturated compound and said thermoplastic compound;

said process comprising:

(A) placing the outer surface of said stratum into contact with the image-receptive surface of a separate element, (B) heating at least one of said elements to a temperature of at least 40° C. but less than the melting point of the complementary image areas while said surfaces are in contact to selectively soften the underexposed image areas of said stratum, and (C) separating the two elements whereby the thermally transferable, underexposed image areas of the stratum are transferred to the image-receptive element.

2. A process according to claim 1 wherein said ethylenically unsaturated compound contains 1 to 4 terminal ethylenic groups.

3. A process as defined in claim 1 wherein said pressing, heating and separating steps are repeated several times, using a separate image-receptive element each time, so that a plurality of images which are copies of said underexposed image areas are obtained, each on a separate image-receptive element.

4. A process as defined in claim 1 wherein said thermally transferable image areas contain a small amount of an addition polymerization initiator activatable by actinic light and inactive thermally below 185° C.

5. A process as defined in claim 1 wherein said polymerizable image areas contain a small amount of an addition polymerization initiator activatable by actinic light and inactive thermally below 185° C., and a small amount of a thermal addition polymerization inhibitor.

6. A process as defined in claim 1 wherein said separate support is a sheet of metal.

7. A process as defined in claim 1 wherein said separate support is a fine mesh screen.

8. A process as defined in claim 1 wherein said separate support is paper.

9. A process as defined in claim 1 wherein the thermally transferable image areas are of hydrophilic character and the image-receptive surface is of hydrophobic character.

10. A process as defined in claim 1 wherein the thermally transferable image areas are of hydrophobic character and the image-receptive surface is of hydrophilic character.

11. A process as defined in claim 1 wherein the thermally transferable image areas contain a colored material.

12. A process as defined in claim 1 wherein the thermally transferable image areas contain a compound which upon heating changes color.

13. A process as defined in claim 1 wherein the thermally transferable image areas contain a compound capable of reacting with a treated surface of the separate element to form a colored image.

14. A process as defined in claim 1 wherein said ethylenically unsaturated compound is a diacrylate of a diol of the formula $HO(CH_2CH_2O)_nH$ where $n$ is an integer from 1 to 20.

15. A process as defined in claim 1 wherein said thermoplastic polymeric compound is a cellulose ester.

16. A process as defined in claim 1 wherein the transferred images are exposed to actinic light until the ethylenically unsaturated compound is addition polymerized.

17. A process as defined in claim 1 in which the photopolymerizable stratum contains a colored dye.

18. A process as defined in claim 1 wherein the element containing the transferred, underexposed image areas is wet with a solvent and the wet image areas are brought into contact with the image-receptive surface of a second separate element and the two elements are separated, whereby an image is transferred to the second image-receptive element.

19. A dry process which comprises:

(A) exposing with actinic light, imagewise, a stratum of a photopolymerizable element, said stratum comprising (*a*) a thermoplastic compound solid at 50° C. and (*b*) a non-gaseous ethylenically unsaturated compound containing at least one terminal ethylenic group, having a boiling point above 100° C. at atmospheric pressure and being capable of forming a high polymer by photo-initiated addition polymerization and having a plasticizing action on said thermoplastic compound, an addition polymerization initiator activatable by actinic light and inactive thermally below 185° C. and a thermal addition polymerization inhibitor until polymerization of said unsaturated compound takes place in the exposed areas without substantial polymerization in the underexposed areas;

(B) pressing the surface of the exposed stratum into contact with the image-receptive surface of a separate element;

(C) heating at least one of the containing elements to a temperature of at least 40° C. to selectively soften the underexposed image areas of said stratum; and (D) separating the two surfaces of said elements whereby underexposed areas of said stratum are transferred to said image-receptive surface.

20. A process according to claim 19 wherein said unsaturated compound contains 1 to 4 terminal ethylenic groups.

21. A process as defined in claim 19 wherein the exposure is through an image-bearing transparency.

22. A process as defined in claim 19 wherein said imagewise exposure is through the stratum by means of reflected light from an image-bearing layer placed beyond said stratum.

References Cited in the file of this patent

UNITED STATES PATENTS

| | | |
|---|---|---|
| 2,616,961 | Groak | Nov. 4, 1952 |
| 2,704,712 | Jackson | Mar. 22, 1956 |
| 2,756,143 | Murray | July 24, 1956 |
| 2,760,863 | Plambeck | Aug. 28, 1956 |
| 2,948,611 | Barney | Aug. 9, 1960 |

FOREIGN PATENTS

| | | |
|---|---|---|
| 741,441 | Great Britain | Dec. 7, 1955 |
| 767,912 | Great Britain | Feb. 6, 1957 |
| 780,218 | Great Britain | July 31, 1957 |